United States Patent [19]
Bendell et al.

[11] Patent Number: 5,779,535
[45] Date of Patent: Jul. 14, 1998

[54] HEATING AND/OR AIR-CONDITIONING SYSTEM FOR A MOTOR VEHICLE

[75] Inventors: Ian Bendell, Mönsheim; Stefan Winkelmann, Bietigheim-Bissingen, both of Germany

[73] Assignee: Behr GmbH & Co., Stuttgart, Germany

[21] Appl. No.: 598,989

[22] Filed: Feb. 9, 1996

[30] Foreign Application Priority Data

Feb. 17, 1995 [DE] Germany ............... 195 05 336.2

[51] Int. Cl.[6] ............................................. B60H 1/26
[52] U.S. Cl. .................... 454/121; 137/637.3; 459/69
[58] Field of Search ......................... 454/121, 124, 454/69; 137/637.3, 637.2, 353, 351, 601

[56] References Cited

U.S. PATENT DOCUMENTS

| | | | |
|---|---|---|---|
| 2,548,071 | 4/1951 | Saulsberry | 137/637.2 |
| 4,222,413 | 9/1980 | Wulf | 137/637.3 |
| 4,582,252 | 4/1986 | Ogihara et al. | |
| 5,350,335 | 9/1994 | Andersson | 454/121 |
| 5,476,418 | 12/1995 | Loup | 454/121 |

FOREIGN PATENT DOCUMENTS

| | | |
|---|---|---|
| 0288379 | 10/1988 | European Pat. Off. |
| 0411399 | 2/1991 | European Pat. Off. |
| 0423778 | 4/1991 | European Pat. Off. |
| 2 480 685 | 10/1981 | France ............... 454/121 |
| 155665 | 1/1904 | Germany ............ 137/637.3 |
| 354653 | 6/1987 | Germany. |
| 223633 | 10/1924 | United Kingdom ... 137/637.3 |
| 2100417 | 12/1982 | United Kingdom. |

Primary Examiner—Harold Joyce
Attorney, Agent, or Firm—Evenson McKeown Edwards & Lenahan, PLLC

[57] ABSTRACT

Heating and/or air-conditioning system for a motor vehicle which has at least two air flaps mounted along a common pivot axis in a housing. For independent control of the air flaps, transmission elements located coaxially with respect to the pivot axis are associated with the two positioning devices.

9 Claims, 3 Drawing Sheets

5,779,535

1

HEATING AND/OR AIR-CONDITIONING SYSTEM FOR A MOTOR VEHICLE

BACKGROUND AND SUMMARY OF THE INVENTION

The invention relates to a heating and/or air-conditioning system for a motor vehicle-with a housing in which at least two air ducts are located side by side, each provided with a pivotable movably mounted air flap, as well as with two positioning devices located externally on the housing and provided to control the air flaps.

It is known to provide a heating and/or air-conditioning system for an automobile that has a housing provided with air ducts. As the air ducts, firstly a central air duct is provided in the housing, flanked on both sides by a defroster duct. Both of the defroster ducts flanking the ventilation duct branch from a mixing chamber. The two defroster ducts and the central ventilation duct are each provided with an air flap to control the air flow. The two air flaps of the lateral defroster ducts are mounted on a common positioning shaft and are controllable jointly by a positioning device. The air flap of the central ventilation duct is pivotable, by means of an additional positioning device, around an additional positioning axis that is parallel to the positioning axis of the defroster air flaps. An object of the invention is to provide a heating and/or air-conditioning system of the of the general type referred to above by means of which a compact design for the housing can be achieved while simultaneously improving the flow through the air ducts.

This and other objects are achieved according to preferred embodiments of the invention by virtue of the fact that the (at least two) air flaps are mounted along a common pivot axis in the housing and that the two positioning devices have associated transmission elements associated with them for mutually independent control of the air flaps, said elements being located coaxially with respect to the pivot axis. The invention is based on the determination that the poor air flow in known heating and/or air-conditioning systems can be attributed to the positioning shaft for the lateral defroster flaps, which runs through the central ventilating duct, since vortices occur in this area. This problem is eliminated by the solution according to the invention since all the air flaps are mounted on one common pivot axis. The solution according to the invention also makes it possible to mount the two positioning devices at the same level so that the required clearance to install the housing is reduced. This results in a more compact design for the housing. By virtue of the transmission elements that are arranged coaxially with respect to one another and to the pivot axis, despite the location of the air flaps on a common pivot axis, it is possible to control the air flaps independently of one another.

In certain preferred embodiments of the invention, both positioning devices are mounted on the common housing exterior, and a transmission cable associated with one positioning device is nonrotatably connected with a hollow shaft on which one air shaft is mounted, and passes through the transmission shaft associated with the other positioning device and mounted nonrotatably on the other air flap. This is a simple mechanical solution that permits independent control of the air flaps.

According to preferred embodiments of the invention, a transmission shaft is provided for common control of two outer air flaps flanking a central air flap. The central flap is rotatably mounted on the transmission shaft and is connected nonrotatably with the outer air flaps on both sides of the central air flap, with the transmission shaft being made

2 on at least one side as a hollow shaft having at least one radial slot through which a guide cam of the central air flap projects radially inward to form a nonrotatable connection with the transmission rod of one positioning device, and with one positioning device being associated with the central air flap and the other positioning device being associated with the two outer air flaps. The transmission shaft has a double function in that it firstly serves as a shaft for the two outer air flaps and secondly serves as a rotational axis for the central air flap. Provision of the positioning devices ensures that the two outer air flaps are always adjusted simultaneously by the same amount. On the other hand, the central air flap can be adjusted independently of the two outer air flaps by the other positioning device.

According to preferred embodiments of the invention, the (at least one) radial slot is formed over a circumferential angle in the hollow shaft that corresponds to the maximum possible pivot angle of the central air flap relative to the transmission shaft. As a result, stops are formed which limit the maximum pivot angle of the central air flap within the air duct and thus define a completely closed and a completely open position in the air duct.

In preferred embodiments of the invention, the central air flap has a groove-like profile allowing the air flap to be mounted on the transmission shaft and to be secured thereto by means of annular securing elements. This permits simple installation and removal of the central air flap.

In preferred embodiments of the invention, the central air flap including the profile and securing elements is manufactured in one piece from plastic and can be clipped radially onto the transmission shaft by means of the securing elements. As a result, neither tools nor additional fastening elements are required to mount the central air flap on the transmission shaft.

In preferred embodiments of the invention, the two outer air flaps are molded onto shaft extensions, each of which can be pushed endwise nonrotatably onto opposite ends of the transmission shaft, and at least the shaft extension associated with the hollow shaft side of the transmission shaft is designed as a hollow shaft extension which rotatably receives the transmission rod. The mounting of the various air flaps is further simplified as a result.

Other objects, advantages and novel features of the present invention will become apparent from the following detailed description of the invention when considered in conjunction with the accompanying drawings.

DETAILED DESCRIPTION OF THE DRAWINGS

Figure 1:
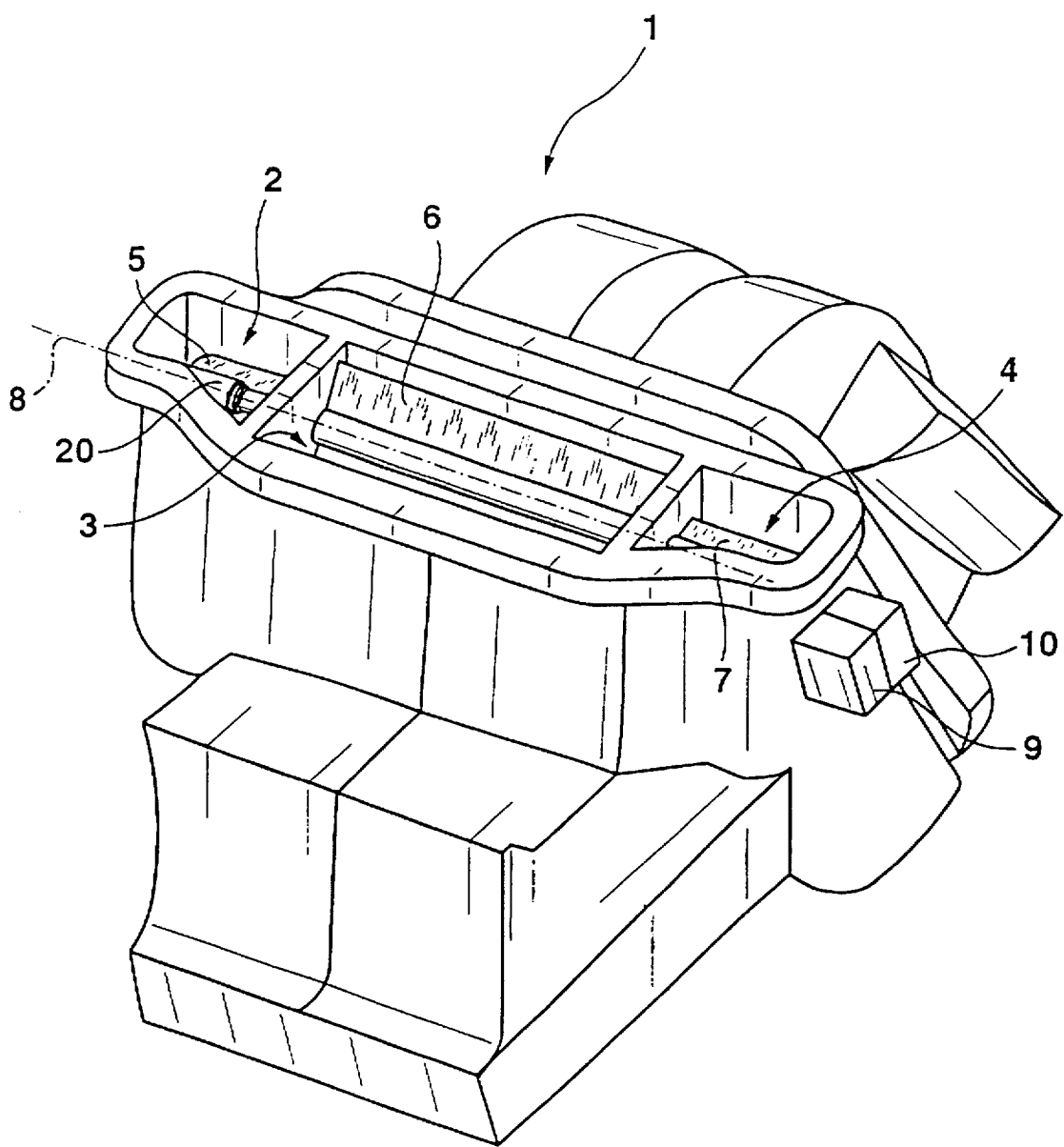
FIG. 1 is a perspective schematic partially exploded view in a simplified form of a housing of an embodiment of a heating and/or air-conditioning system according to the invention for a motor vehicle in which a central ventilation duct is flanked by two lateral defroster ducts.

A heating and/or air-conditioning system for an automobile has a housing (1) corresponding to FIG. 1, which is made of plastic. Housing (1) has as a central air duct, a ventilation duct (3) which in the vicinity of its outlet to a vehicle interior of the automobile (known of itself and therefore not shown) has a rectangular flow cross section. The relatively wide ventilation duct (3) is flanked in the outlet area of housing (1) to the vehicle interior by two lateral air ducts constituting defroster ducts (2, 4). The defroster ducts (2, 4) are located on the two opposite narrow sides of ventilation duct (3), each located laterally and externally next to the latter. Both defroster ducts (2, 4), have the same flow cross sections, with these cross sections each having a trapezoidal shape.

To control the air throughput volume which reaches the vehicle interior, ventilation duct (3) in the outlet area of housing (1) has a ventilation flap (6) constituting a central air flap, said flap (6) being pivotable between a closed and an open end position by means of a positioning device (10) located on one outer side of the housing and shown only schematically. In addition, the two defroster ducts (2, 4) each have a lateral air flap in the form of two defroster flaps (5, 7) which are pivotable, by means of a positioning device (9) located next to positioning device (10) on the outside of the housing, jointly and by the same pivot angle between end positions which open defroster ducts (2, 4), and close defroster ducts (2, 4). Both the two defroster flaps (5, 7) and the central ventilation flap (6) can in fact be controlled independently of one another but are mounted along a common pivot axis (8) extending transversely through all three air ducts. All three air flaps are mounted in the corresponding walls of housing (1) and have plate-like shapes whose surfaces correspond to the free flow cross sections of the respective air ducts (2, 3, 4). The common pivot axis (8) extends approximately centrally through the three air ducts (2, 3, 4) so that the coaxially pivotable air flaps (5, 6, 7) extend on both sides of this pivot axis. Each positioning device (9, 10) in this embodiment has an electrical positioning motor which is controllable independently of a corresponding regulation of the heating and/or air-conditioning system.

Figure 3:
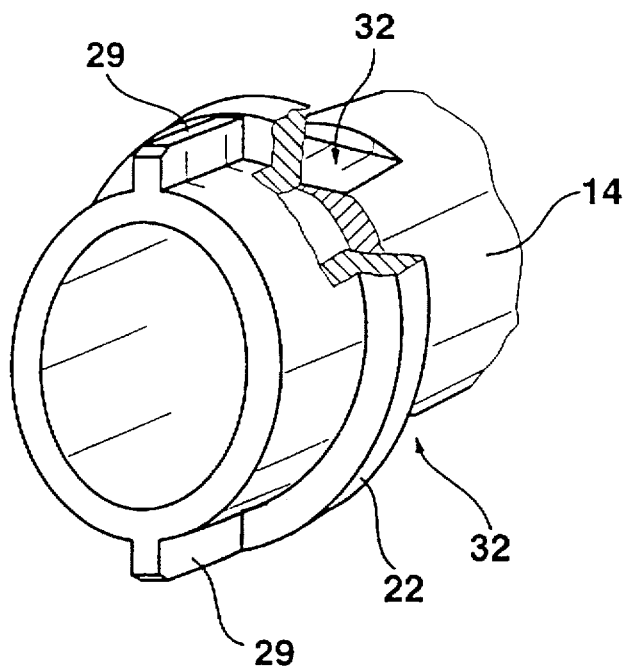
FIG. 3 is an enlarged view of one end of a hollow shaft according to FIG. 2 at the level of Arrow III.
Figure 4:
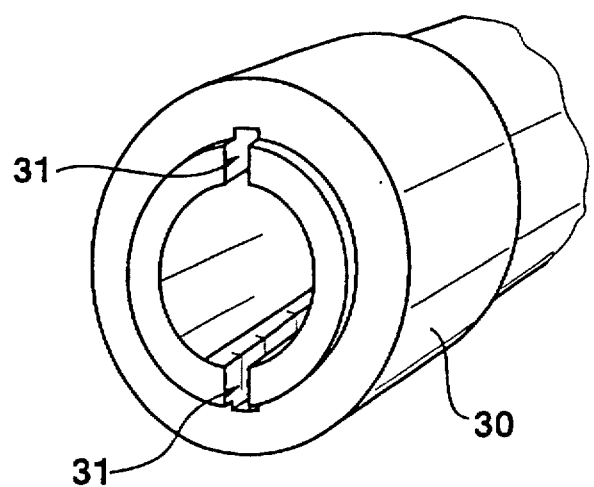
FIG. 4 is also a perspective view, but on a different scale, of one end of a hollow shaft extension on which a defroster flap is mounted.

In order to permit independent control of both the central ventilation flap (6) and the two lateral defroster flaps (5, 7) with simultaneous mounting on a common pivot axis, the bearing arrangement which will be described in greater detail below with reference to FIGS. 2–4, was selected for the ventilation flap (6) and the two defroster flaps (5, 7). In the preferred embodiment shown, all parts of the bearing arrangement including air flaps (5, 6, 7) are made from plastic by a suitable injection molding process. Embodiments of the invention are also contemplated with some or all parts of the embodiments shown being constructed out of other suitable materials.

Central ventilation flap (6) in the vicinity of its central lengthwise axis, which corresponds in the installed state to pivot axis (8), has a groove-shaped lengthwise section (15) provided for rotatable acceptance of a hollow shaft (14) extending through the entire length of ventilation flap (6) and serving as a transmission shaft. When embedded in section (15), hollow shaft (14) extends coaxially with respect to the central lengthwise axis of ventilation flap (6) and hence also extends coaxially with respect to pivot axis (8).

In order to secure hollow shaft (14) in its embedded position in section (15) of ventilation flap (6), two securing clamps (21), corresponding to the shape of an open ring, are molded on the two opposite ends of section (15) and have a certain radial elasticity because of the properties of the plastic. Hollow shaft (14) can be clipped between these securing clamps (21) when it is embedded in section (15), so that it is radially secured in a position in which it is partially surrounded by section (15). To prevent axial shifting of hollow shaft (14) relative to ventilation flap (6), two annular beads (22) are provided in the vicinity of the opposite ends of hollow shaft (14), said beads projecting radially outward. The distance between the two annular beads (22) molded on hollow shaft (14) is adapted in such fashion to the spacing of the opposite securing clamps (21) of ventilation flap (6) that each annular bead (22) abuts axially and externally the end of section (15) defined by the respective securing clamp (21) and thus abuts ventilation flap (6). The assembly of hollow shaft (14) in section (15) of ventilation flap (6) is indicated by the two curved arrows A.

The rotatability of ventilation flap (6) relative to hollow shaft (14) around pivot axis (8) is limited by a plurality of stops which will be discussed sequentially in greater detail below. For this purpose, firstly four radial slots (23, 24a, 24b, 24c) are provided in hollow shaft (14), said slots being arranged with axial distances between them and partially staggered with respect to one another in the circumferential direction. In the assembled state of hollow shaft (14), four corresponding guide cams (26, 25a, 25b, 25c) project radially inward through radial slots (23, 24a, 24b, 24c). The lengths of the four radial slots (23, 24a, 24b, 24c) in the circumferential direction correspond to one another, so that guide cams (26, 25a, 25b, 25c) define a maximum pivot range of ventilation flap (6) relative to hollow shaft (14). This is adapted to the corresponding conditions of housing (1) of the heating and/or air-conditioning system as well as the desired maximum throughput volume.

In the assembled state of hollow shaft (14) in section (15), guide cam (26) projects radially inward through radial slot (23), guide cam (25a) projects radially inward through radial slot (24a), guide cam (25a) projects radially inward through radial slot (24b), and guide cam (25c) projects radially inward through radial slot (24c). The three guide cams (25a, 25b, 25c) each have a stepped shoulder located radially inward, with guide cams (25a and 25b) being located at the same height and radially opposite guide cam (25c) in section (15). The stepped shoulders of the three guide cams (25a, 25b, 25c) produce a radially positive receptacle for a square (27) of a transmission rod (18), which can be inserted coaxially from one end into hollow shaft (14).

Figure 2:
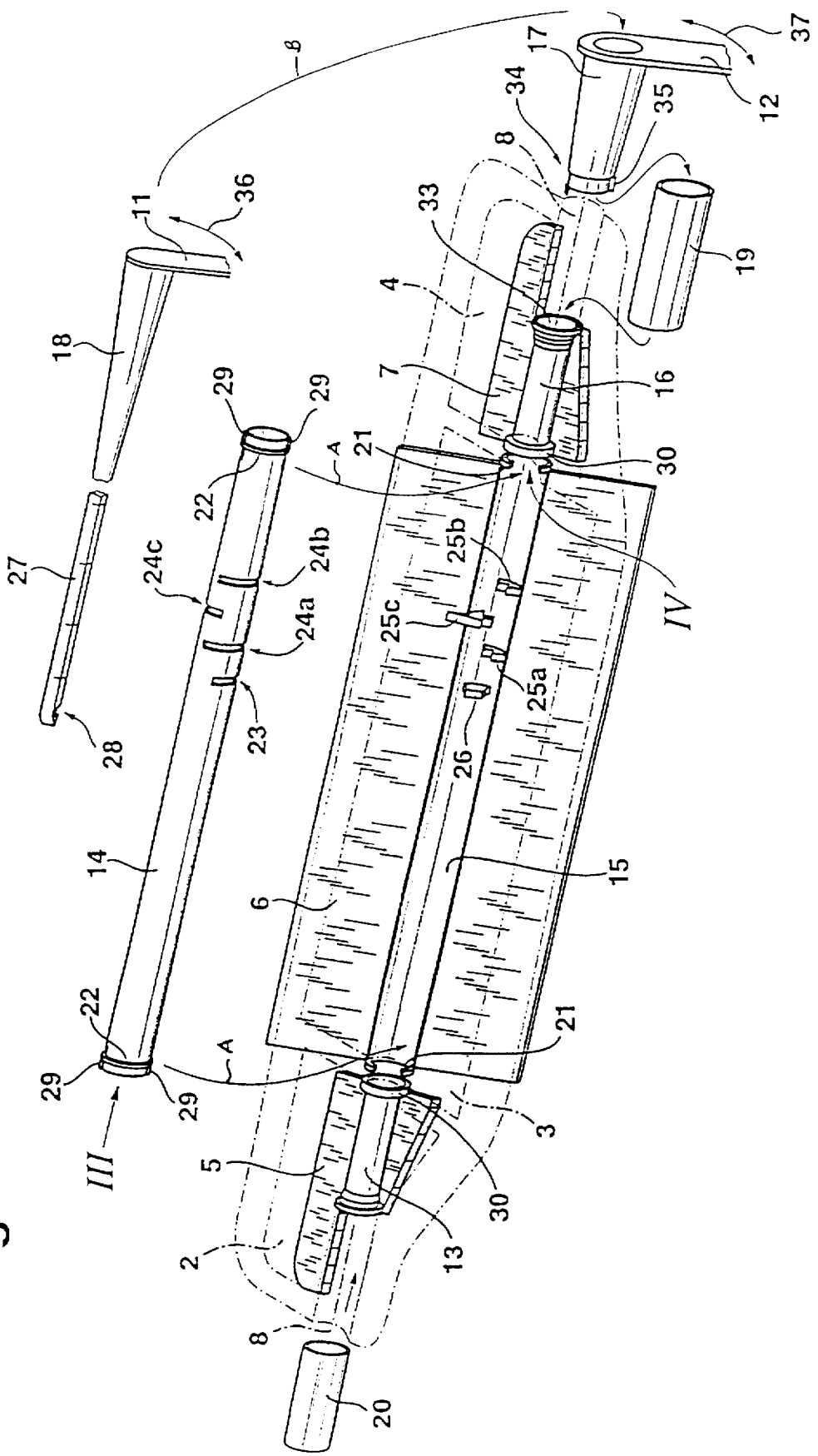
FIG. 2 is an exploded view of the air flap arrangement in the ventilation duct and in the two defroster ducts, with all three air flaps being mounted on a common pivot axis.

In the embodiment shown, transmission rod (18) is inserted from the right end relative to FIG. 2 as depicted by arrow B. When transmission rod (18) is inserted, square (27) is received positively between guide cams (25a, 25b, 25c), resulting in a nonrotatable connection with transmission rod (18) and section (15) and hence with vent flap (6). Upon axial insertion of transmission rod (18) into hollow shaft (14), a locking hook (28) located endwise pushes onto guide cam (26) designed as a locking area, thus defining a locked end position of transmission rod (18) in hollow shaft (14) and hence relative to vent flap (6). Guide cams (25a, 25b, 25c) therefore additionally form an axial guide for square (27) of transmission rod (18) for delimiting the pivot range of vent flap (6) relative to hollow shaft (14). Guide cam (26) also has a dual function in that it firstly likewise contributes to limiting the pivoting range of vent flap (6) and secondly, by interlocking with endwise locking hook (28) of transmission rod (18), secures the mounted end position of transmission rod (18). Transmission rod (18), at its end opposite locking hook (28), has a radially projecting adjusting lever (11), connected with the positioning motor of adjusting device (9). When adjusting lever (11) is pivoted by the adjusting motor of positioning device (9) in the direction of double arrow (36), transmission rod (18) is pivoted around pivot axis (8) and thus ventilation flap (6) connected nonrotatably with transmission rod (18) is pivoted by a corresponding amount.

Transmission rod (18) expands in its area between square (27) and adjusting lever (11) in a conical fashion to form adjusting lever (11). This produces an axial lock for all additional elements located between hollow shaft (14) and transmission rod (18), said elements being described in greater detail below. In the vicinity of securing clamps (21) and annual beads (22), a bearing sleeve, not shown, is provided, by means of which ventilation flap (6) and hollow shaft (14) are mounted coaxially with respect to pivot axis (8) in the opposite housing partitions between air ducts (2, 3, 4). In order to simplify the clipping of hollow shaft (15) in the vicinity of securing clamps (21), the jacket of hollow shaft (14) is provided at the level of the opposite securing clamp (21) and in the immediate vicinity of corresponding annular bead (22) with two opposite flats (32) (FIG. 3). In the vicinity of the opposite outer ends of hollow shaft (14) two securing cams (29) are provided that are opposite one another and project radially outward. On each end of hollow shaft (14) a hollow shaft extension (13, 16) provided with associated defroster flap (5, 7) can be mounted. In order to produce a nonrotatable plug-in connection, the associated ends of hollow shaft extensions (13, 16) (FIG. 4) have axial grooves (31) corresponding to safety cams (29). Axial grooves (31) are each shaped to form a ring (30) with a diameter larger than the diameter of hollow shaft extension (13, 16). Each hollow shaft extension (13, 16) extends coaxially with respect to pivot axis (8) through the respective defroster duct (2) and is nonrotatably mounted relative to housing (1) at its end facing away from hollow shaft (14) in a manner which will be described in greater detail below. Hollow shaft extension (13) is then mounted at its free end in a bearing sleeve (20) imbedded in the corresponding housing wall of housing (1) (FIG. 1). In an embodiment that is not shown, a permanent mount molded in the housing wall is provided instead of a bearing sleeve.

The defroster flaps (5, 7) which extend radially and axially like wings on both sides of pivot axis (8) are molded on each hollow shaft extension (13, 16). By virtue of the nonrotatable mounting of both defroster flap (5) and defroster flap (7) on the opposite ends of hollow shaft (14), both defroster flaps (5 and 7), together with hollow shaft (14) and independently of central ventilating flap (6), are pivotable around pivot axis (8). In order to produce a pivoting of hollow shaft (14) and therefore of the two defroster flaps (5 and 7) as well by means of adjusting device (10), a transmission sleeve (17) is inserted and locked in the free end (33) of hollow shaft extension (16) through which transmission rod (18) projects, said sleeve having a radially projecting adjusting lever (12) at its end facing away from sleeve extension (16). Adjusting lever (12) is rigidly connected with transmission sleeve (17). Transmission sleeve (17) is made axially hollow all the way through and is thus also hollow in the vicinity of adjusting lever (12). In the vicinity of its end which contributes to the plug-in and locking connection, transmission sleeve (17) has an undercut area of smaller diameter which has on one side, in the vicinity of its jacket, an axially securing cam (35) and on the opposite side a locking hook (34) that projects axially forward. In this locking and plugging area at end (33) of hollow shaft extension (16), an axial groove corresponding to securing cam (35) and on the other side a corresponding locking position to receive locking hook (34) are provided. Transmission sleeve (17) is therefore insertable in end (33) of hollow shaft extension (16) and axially secured by the lock in the inserted state. Securing cam (35) simultaneously ensures a nonrotatable connection with hollow shaft extension (16).

Transmission sleeve (17) has a wall that expands conically between the locking and plugging area and adjusting lever (12), with the interior of transmission sleeve (17) being adapted to the conically expanding area of transmission rod (18), so transmission sleeve (17) can receive, freely rotatably, the conically expanding area of transmission rod (18). The maximum outside diameter of the conically expanded area of transmission rod (18) is smaller than the maximum inside diameter of transmission sleeve (17). In addition, transmission rod (18), in the vicinity of adjusting lever (11), in a manner not shown, has a stop bead which axially abuts the associated end of transmission sleeve (17). By virtue of this measure, jamming of transmission rod (18) inside transmission sleeve (17) is avoided. Transmission sleeve (17) in turn is mounted freely rotatably in a bearing sleeve (19), set in a corresponding housing wall. During the assembly of transmission sleeve (17) therefore, bearing sleeve (19) is first pushed onto transmission sleeve (17) and then transmission sleeve (17) is inserted into hollow shaft extension (16). The length of transmission rod (18), i.e. the distance between locking hook (28) and the stop bead, not shown, of transmission rod (18), roughly corresponds to the distance from the end of transmission sleeve (17) in the vicinity of adjusting lever (12) to guide cam (26) in section (15) of vent flap (6) in the assembled state. In this way, transmission rod (18) axially secures both hollow shaft extension (16) and transmission sleeve (17) in the mounted state against coming loose from hollow shaft (14).

By pivoting adjusting lever (12) by means of an adjusting motor of adjusting device (9) in the direction of double arrow (37) around pivot axis (8), hollow shaft (14) and thus both defroster flaps (5, 7) as well are pivoted simultaneously and by the same pivot angle. Since however vent flap (6) is also mounted to be freely rotatable on hollow shaft (14), an independent control, i.e. pivoting of vent flap (6) by adjusting device (10), is possible. The relative pivot angle range between hollow shaft (14) and vent flap (6), defined by the length of radial slots (23, 24a–24c), is selected so that even with defroster flaps (5 and 7) already pivoted to the maximum end position, complete mobility of vent flap (6) between its two end positions is still possible. Conversely, the positions and lengths of curved radial slots (23, 24a–24c) are selected so that even when vent flap (6) is set to its maximum end position, complete mobility of defroster flaps (5 and 7) is still ensured.

By virtue of the solution according to the invention, an extremely compact design for the air flap arrangement is obtained which permits reducing the space for installation of housing (1) Since all air flaps also have a common pivot axis, losses in efficiency caused by flow around a positioning shaft that passes through a flow chamber upstream from a vent flap is avoided.

In the embodiment described above, according to FIGS. 1–4, adjusting devices (9 and 10) are located on a common side of housing (1). In other embodiments according to the invention, the adjusting devices are provided separated in space from one another on opposite sides of the housing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Heating and/or air-conditioning system, for a motor vehicle, with a housing containing at least two air ducts each provided with a pivotable movably mounted air flap, and also containing first and second flap adjusting devices located externally on the housing, and serving to control the air flaps, wherein the air flaps are mounted on a common pivot axis in the housing, wherein the first and second adjusting devices have respective associated transmission elements arranged coaxially with respect to the pivot axis for facilitating mutually independent control of the air flaps, wherein two external air flaps flanking a central air flap are provided, wherein a transmission shaft is provided for common control of the two external air flaps independently of the central air flap, the central air flap being rotatably mounted on the transmission shaft, the transmission shaft being nonrotatably connected on both sides of the central air flap with the external air flaps, wherein the transmission shaft is made on at least one side as a hollow shaft, having at least one radial slot through which a guide cam of the central air flap extends radially inward for nonrotatable connection with a transmission rod of the first positioning device, and wherein the central air flap and the second positioning device are associated with the two outer air flaps.

2. Heating and/or air-conditioning system according to claim 1, wherein the radial slot is formed to extend by a circumferential angle in the hollow shaft that corresponds to the maximum possible pivot angle of the air flaps with respect to one another.

3. Heating and/or air-conditioning system according to claim 2, wherein the central air flap has a groove-shaped profile by which the central air flap can be mounted on the transmission shaft and can be secured to the latter by means of annular securing elements.

4. Heating and/or air-conditioning system according to claim 3, wherein the central air flap including the groove shaped profile and the securing elements is made in one piece from plastic and can be clipped radially by means of the securing elements onto transmission shaft.

5. Heating and/or air-conditioning system according to claim 4, wherein the two outer air flaps are molded on shaft extensions, each of which shaft extensions is mounted nonrotatably endwise on opposite ends of the transmission shaft, and wherein at least one of the shaft extensions associated with the hollow shaft end of the transmission shaft is made as a hollow shaft extension that nonrotatably receives the transmission rod.

6. An air flow control system for an air-conditioning system of a passenger motor vehicle, comprising:

a housing defining at least two air ducts, an air flap disposed in each of said air ducts, said air flaps being pivotable abut a common axis between respective open and closed positions, and independently operable flap adjusting devices operably connected to said air flaps, wherein said housing defines a central air duct and a pair of auxiliary air ducts disposed at respective opposite sides of the central air duct, wherein said air flaps include a central air flap in said central air duct and respective auxiliary air flaps in said auxiliary air ducts, and wherein said flap adjusting devices includes a first flap adjusting device operably connected to said central air flap and a second flap adjusting device operably connected to both of said auxiliary air flaps.

7. An air flow control system according to claim 6, wherein said first and second adjusting devices include transmission members pivotable about said common axis.

8. An air flow control system according claim 7, wherein said first adjusting device includes a central flap supporting tubular member extending along said common axis and non-rotatably fixed to the central air flap, and wherein said second adjusting device includes a transmission unit extending coaxially with said common axis and non-rotatably fixed to both of said auxiliary flaps.

9. An air flow control system according to claim 8, wherein said central flap supporting tubular member and said transmission unit are supported to be rotatable with respect to one another and independently of one another about said common axis.

* * * * *